Patented June 6, 1944

2,350,435

UNITED STATES PATENT OFFICE 2,350,435

DERIVATIVES OF ASCORBIC ACID

Percy A. Wells, Abington, and Daniel Swern, Melrose Park, Pa., assignors to Claude R. Wickard, as Secretary of Agriculture of the United States of America, and to his successors in office No Drawing. Application May 11, 1942,
Serial No. 442,558

11 Claims. (Cl. 260—344.5)

(Granted under the act of March 3, 1883, as
amended April 30, 1928; 370 O. G. 757)

This application is made under the act of March 3, 1883, as amended by the act of April 30, 1928, and the invention herein described and claimed, if patented, may be manufactured and used by or for the Government of the United States of America for governmental purposes without the payment to us of any royalty thereon.

This invention relates to compounds of the ascorbic acid series and is directed more particularly to the carboxylic acid esters of these compounds and to a method for producing the same.

The spatial configuration of the two enantiomorphic forms of ascorbic acid having the empirical formula $C_6H_8O_6$ is believed to be represented by the following structural formulas:

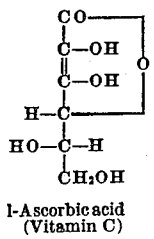 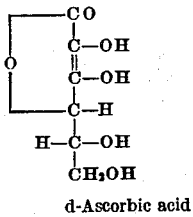

l-Ascorbic acid (Vitamin C)    d-Ascorbic acid

It is well known that, with the exception of the optical rotation, enantiomorphic compounds possess identical physical and chemical properties. In the present specification and claims the term ascorbic acid is meant therefore to include both the d- and the l-form of ascorbic acid.

Ascorbic acid is of considerable importance in the treatment of a number of pathological conditions resulting from a lack of an adequate intake of vitamin C (l-ascorbic acid).

For parenteral administration of ascorbic acid it is desirable to have stable, sterile solutions which may be kept in ampules until needed. This has not been found possible, however, in the case of aqueous solutions of ascorbic acid itself, due to the fact that these solutions gradually undergo autoxidation and become less active physiologically. Moreover, the acidity of the solutions is so high that the injections may be painful or even produce tissue damage. Certain metallic salts of ascorbic acid have been used to overcome the latter objection as their solutions have more acceptable pH values. However, solutions of the metallic salts of ascorbic acid also tend to undergo autoxidation resulting in a lowering of their physiological potency. Non-aqueous solutions of fatty acid esters of ascorbic acid are more stable and do not possess the above-mentioned undesirable characteristics of ascorbic acid.

It has been shown recently that ascorbic acid and related substances are valuable antioxidants for fats and for aqueous-oil emulsions (Journal of the American Chemical Society, 1941, 63, 1279; U. S. Patent 2,159,986).

However, ascorbic acid and other compounds of the ascorbic acid series are relatively insoluble in anhydrous fatty and oily substances and this property limits their utility as antioxidants.

It has been proposed (German Patent 639,776) to prepare fat soluble derivatives of ascorbic acid by heating calcium or sodium salts of ascorbic acid with chlorides of higher fatty acids. By this method, however, only very low yields of ascorbyl esters are obtained and in these esters one of the hydroxyl groups of the ene-diol group present in ascorbic acid is esterified.

It is known that the oxidation-reduction properties of compounds of the ascorbic acid series are due to the presence in their molecules of an unsubstituted ene-diol group, that of the atomic grouping.

We have discovered that compounds of the ascorbic acid series can be esterified by reacting them with aliphatic monocarboxylic acids in the presence of concentrated sulfuric acid.

Since the reactions of the unsubstituted ene-diol group present in the compounds of the ascorbic acid series used as starting materials, are also obtained with the products of our process it is apparent that in our process esterification does not take place in the ene-diol group but in any of the other hydroxyl groups of the starting material.

While our invention is not limited to any particular hypothesis as to the mechanism of the esterification reaction it is likely that in our process the esterification of ascorbic acid takes place according to one or both of the following equations:

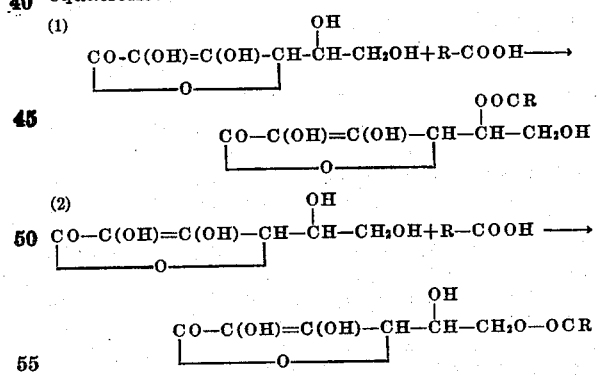

Either of these reactions would yield ascorbyl monoesters containing an unsubstituted ene-diol group. Similar reactions probably occur when our process is applied to other compounds of the ascorbic acid series.

Our process is applicable to ascorbic acid and also to other compounds of the ascorbic acid series, that is, to compounds having the general formula:

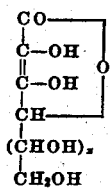

Wherein $x$ is 0 or a low whole number.

Thus our process is applicable for instance to such compounds as: d-ascorbic, l-ascorbic, d-isoascorbic, l-isoascorbic acids, l-glucoascorbic acids, and to other compounds of the ascorbic acid series, such as for example those described in U. S. Patents 2,206,374 and 2,207,680.

As fatty acids we may use in our process any saturated aliphatic monocarboxylic acid, the higher members of the homologous series yielding esters which are more readily soluble in anhydrous fatty and oily materials.

According to our process the fatty acid and the compound of the ascorbic acid series are dissolved in concentrated sulfuric acid and the reaction mixture is maintained at a suitable temperature for the length of time necessary to effect esterification. The reaction products are then isolated from the solution by any suitable procedure, for example by dilution with water followed by solvent extraction.

The products thus obtained are monoesters containing an unsubstituted ene-diol group. The presence of the unsubstituted ene-diol group in the products of our process can be established by known analytical methods. For example, alkali titrations of alcoholic solutions of the esters indicate the presence in the ester molecule of one titratable acidic enolic hydrogen. The esters can also be titrated essentially by the standard iodometric method (U. S. P. XI, 1939, Supplement page 14), and acetone solutions of the esters readily decolorize, at room temperature, solutions of potassium permanganate in acetone.

In carrying out our process we prefer to use 90-95 percent sulfuric acid. However, sulfuric acid of other concentrations may be employed, provided that it is adapted for performing the dual function of an esterification catalyst and of a solvent for the components of the reaction mixture.

The esterification may be carried out at any temperature which will not cause any substantial decomposition of the components of the reaction mixture. When 95 percent sulfuric acid is used satisfactory results are usually obtained by operating at ordinary room temperature.

As claimed by Percy A. Wells and Roy W. Riemenschneider in their application Serial No. 472,280 filed January 13, 1943, the monoesters of fatty acids obtained by the process of our invention are valuable antioxidants, some of which are especially well suited for use in edible fats and oils.

The non-aqueous solutions of the fatty monoesters of ascorbic acid are exceedingly stable for long periods of time, and their solutions in suitable media possess characteristics which make them especially adaptable for use in antiscorbutic compositions.

As illustrative embodiments of a manner in which our invention may be carried out in practice the following examples are given in which our process is described as applied to ascorbic acid.

Example 1

8.8 grams of ascorbic acid and 8.0 grams of lauric acid are dissolved at room temperature in 100 cubic centimeters of 95 percent sulfuric acid, and the solution is allowed to stand at room temperature for about 16 hours (overnight).

The reaction mixture is then poured slowly and with vigorous agitation into about 500 grams of chopped ice. Agitation is continued until the oily phase of the drowned mixture has solidified. The mixture is then extracted with ether, and the ether extract washed with water until the washings are substantially acid free.

The ether extract is dried and evaporated to dryness.

The dry, white residue thus obtained is powdered and washed by decantation with 200 to 300 cubic centimeters of petroleum ether (boiling range 35-60° C.) thereby removing a small amount of unreacted fatty acid present in the reaction product. The white residue insoluble in petroleum ether consists essentially of ascorbyl monolaurate. The yield is about 75-80 per cent of the theory. To remove all traces of moisture from the ester the material is dried at about 60° C. under a high vacuum. For analytical purposes the product is further purified by recrystallization from an ether-petroleum ether mixture.

The anhydrous ascorbyl-monolaurate has the following characteristics:

| | |
|---|---|
| Melting point _____°C__ | 105.5-106.5 |
| Combined fatty acid_____Percent__ | 55.4 |
| Equivalent weight by iodine titration_____ | 177.9 |
| Neutralization equivalent_____ | 356.5 |

Example 2

8.8 grams of ascorbic acid are esterified with 9.1 grams of myristic acid in 100 cc. of 95 percent sulfuric acid by the procedure described in Example 1. The ascorbyl monomyristate thus obtained has the following characteristics.

| | |
|---|---|
| Melting point _____°C__ | 110.5-111.5 |
| Combined fatty acid_____Percent__ | 59.7 |
| Equivalent weight by iodine titration_____ | 193.1 |
| Neutralization equivalent_____ | 383.5 |

Example 3

Ascorbyl monopalmitate is prepared by the procedure described in Example 1, using 8.8 grams of ascorbic acid, 10.3 grams of palmitic acid and 100 cc. of 95 percent sulfuric acid.

The ester has the following characteristics:

| | |
|---|---|
| Melting point _____°C__ | 116-117 |
| Combined fatty acid_____Percent__ | 62.4 |
| Equivalent weight by iodine titration___ | 206.4 |
| Neutralization equivalent_____ | 413.2 |

Example 4

Ascorbyl monostearate is prepared by the procedure described in Example 1, using 8.8 grams of ascorbic acid, 11.4 grams of stearic acid and 100 cc. of 95 percent sulfuric acid.

The ester has the following characteristics:

| | |
|---|---|
| Melting point _____°C__ | 117.5-118 |
| Combined fatty acid_____Percent__ | 64.0 |
| Equivalent weight by iodine titration_____ | 222.1 |
| Neutralization equivalent_____ | 441.7 |

Example 5

Ascorbyl monocaproate is prepared by the procedure described in Example 1, using 8.8 grams of ascorbic acid, 4.6 grams of caproic acid and 100 cc. of 95 percent sulfuric acid.

*Example 6*

Ascorbyl mono-9,10-dihydroxystearate is prepared from 8.8 grams of ascorbic acid and 12.6 grams of 9,10-dihydroxystearic acid as described in Example 1, using 100 cc. of 95 percent sulfuric acid.

Other aliphatic monocarboxylic acids may be used in the preparation of ascorbyl esters. Mixtures of ascorbyl monoesters are obtained by replacing the pure fatty acid by equivalent amounts of commercial mixed fatty acids.

We claim:

1. Monoesters of compounds of the ascorbic acid series with saturated aliphatic monocarboxylic acids, said esters containing an unsubstituted ene-diol group.

2. Compounds of the formula:

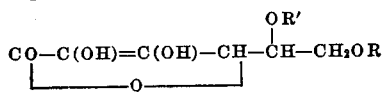

wherein one of the substituents R and R' represents an acyl radical of a saturated aliphatic monocarboxylic acid and the other represents a hydrogen atom.

3. Ascorbyl monoesters of a saturated aliphatic monocarboxylic acid containing from 12 to 18 carbon atoms, the ascorbyl radical of said esters containing an unsubstituted ene-diol group.

4. Ascorbyl monoesters of saturated aliphatic monocarboxylic acids the ascorbyl radical of said esters containing an unsubstituted ene-diol group.

5. Ascorbyl monolaurate containing an unsubstituted ene-diol group.

6. Ascorbyl monopalmitate containing an unsubstituted ene-diol group.

7. Ascorbyl monostearate containing an unsubstituted ene-diol group.

8. The method of producing esters of the ascorbic acid series which comprises reacting a compound of the ascorbic acid series with a saturated aliphatic monocarboxylic acid in the presence of concentrated sulfuric acid.

9. The method of producing monoesters of the ascorbic acid series said esters containing an unsubstituted ene-diol group, which comprises reacting a compound of the ascorbic acid series with a saturated aliphatic monocarboxylic acid in the presence of concentrated sulfuric acid.

10. The method of producing ascorbyl monoesters containing an unsubstituted ene-diol group which comprises reacting ascorbic acid with a saturated aliphatic monocarboxylic acid in the presence of concentrated sulfuric acid.

11. The method as defined in claim 10 in which the monocarboxylic acid is a higher fatty acid.

PERCY A. WELLS.
DANIEL SWERN.